United States Patent
Hagan (10) Patent No.: US 8,663,362 B2
(45) Date of Patent: Mar. 4, 2014

(54) AIR CLEANING SYSTEMS AND METHODS

(75) Inventor: John Mark Hagan, Tyler, TX (US)

(73) Assignee: Trane International Inc., Piscataway, NJ (US)

( * ) Notice: Subject to any disclaimer, the term of this patent is extended or adjusted under 35 U.S.C. 154(b) by 477 days.

(21) Appl. No.: 13/025,420

(22) Filed: Feb. 11, 2011

(65) Prior Publication Data

US 2012/0204715 A1    Aug. 16, 2012

(51) Int. Cl.
*B03C 3/36* (2006.01)

(52) U.S. Cl.
USPC .................. 95/2; 95/12; 95/23; 95/78; 96/18; 96/63; 96/397

(58) Field of Classification Search
USPC .............. 95/2, 3, 8, 12, 23, 78; 96/18, 19, 63, 96/397; 55/418
See application file for complete search history.

(56) References Cited

U.S. PATENT DOCUMENTS

| | | | |
|---|---|---|---|
| 2,897,914 A | | 8/1959 | Camp et al. |
| 3,059,395 A | | 10/1962 | Gallaer |
| 4,253,852 A | | 3/1981 | Adams |
| 4,987,839 A | * | 1/1991 | Krigmont et al. .................. 95/2 |
| 5,855,646 A | * | 1/1999 | Verini ............................... 95/23 |
| 6,245,131 B1 | | 6/2001 | Ripplemeyer et al. |
| 6,984,256 B2 | * | 1/2006 | Lamprecht et al. ............... 95/23 |
| 7,569,100 B2 | * | 8/2009 | Tanaka et al. .................... 96/18 |
| 2006/0130657 A1 | * | 6/2006 | Bohlen et al. .................... 96/58 |
| 2008/0000349 A1 | * | 1/2008 | Pape et al. ........................ 95/23 |
| 2008/0066616 A1 | * | 3/2008 | Sprinkle .......................... 95/23 |

FOREIGN PATENT DOCUMENTS

JP    54-2266 A  *  1/1979  ........................ 95/12

OTHER PUBLICATIONS

Robinson, Myron; Turbulence in Electrostatic Precipitators . . . a review of the research literature; Minerals Processing, May 1968; pp. 13-17.

* cited by examiner

*Primary Examiner* — Richard L Chiesa
(74) *Attorney, Agent, or Firm* — Conley Rose, P.C.; J. Robert Brown, Jr.; Alan Dawson Lightfoot (57) ABSTRACT

An HVAC system having an air cleaner, a fan configured to selectively generate an air flow, wherein at least a portion of the air flow is passed through the air cleaner, and a controller configured to control the air cleaner in response to at least one of a setting for controlling the fan and an operation characteristic of the fan is disclosed. A method of controlling an air cleaner by determining an air flow related criterion value, wherein the air flow is associated with an air flow through an air cleaner, comparing the determined air flow related criterion value to a threshold criterion value, and controlling the air cleaner as a function of a result of comparing the determined air flow related criterion value to the threshold criterion value is disclosed. A method of controlling an ozone concentration outputted by an air cleaner is disclosed.

10 Claims, 6 Drawing Sheets

AIR CLEANING SYSTEMS AND METHODS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some air cleaners are configured to remove particulate matter from air using a process sometimes referred to as electrostatic precipitation. Some air cleaners comprise electrostatic precipitators configured to perform differently in response to the characteristics of the electrical energy supply. In some cases, an air cleaner may comprise a fan configured to draw or push air through a passage of the air cleaner. In other cases, an air cleaner may be used in combination with a heating, ventilation, and/or air conditioning system (HVAC system) so that a fan of the HVAC system may be operated to draw or push air through a passage of the air cleaner.

SUMMARY OF THE DISCLOSURE

In some embodiments of the disclosure, an HVAC system is provided that comprises an air cleaner, a fan configured to selectively generate an air flow, wherein at least a portion of the air flow is passed through the air cleaner. The HVAC system further comprises a controller configured to control the air cleaner in response to at least one of a setting for controlling the fan and an operation characteristic of the fan.

In other embodiments of the disclosure, a method of controlling an air cleaner is provided that comprises determining an air flow related criterion value, wherein the air flow is associated with an air flow through an air cleaner. The method further comprises comparing the determined air flow related criterion value to a threshold criterion value and controlling the air cleaner as a function of a result of comparing the determined air flow related criterion value to the threshold criterion value.

In still other embodiments of the disclosure, a method of controlling an ozone concentration outputted by an air cleaner is provided. The method comprises establishing a functional relationship between an air flow related criterion and a correlated power level setting of an air cleaner, wherein the air flow related criterion is associated with a fan configured to selectively generate an air flow at least partially directed through the air cleaner. The method further comprises determining an air flow related criterion value, using the determined air flow related criterion value and the functional relationship to determine a correlated power level setting value, and controlling the air cleaner as a function of the determined correlated power level setting value.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Some electrostatic precipitation air cleaners generate ozone as a byproduct of the electrostatic precipitation process. Some air cleaners generate a substantially constant amount of ozone in response to operation of the air cleaner at a constant power level setting of the air cleaner, filter efficiency setting of the air cleaner, and/or other operating characteristic of the air cleaner. However, while the amount of ozone generated by the air cleaner, in some embodiments, may be substantially constant, a volumetric air flow-rate of air passing through the air cleaner may vary. It follows that such a constant rate of ozone generation combined with a variable volumetric flow-rate of air through the air filter generally results in variations of the concentration of ozone in the air outputted from the air cleaner. Put another way, some air cleaners may provide outputted air having an ozone concentration that is not substantially constant over time and the ozone concentration of the outputted air may be a function of the volumetric flow-rate of the air exiting the air filter.

In some cases, controlling concentrations of ozone in air outputted from an air cleaner may be desirable. Accordingly, this disclosure provides systems and methods for affecting an ozone concentration of air outputted from an air cleaner. In some embodiments, the ozone concentration may be affected by controlling the rate at which an air cleaner generates ozone as a function of one or more of user inputted control preferences, measured feedback, control signals, and/or any other factor indicative of a desired, measured, and/or predicted volumetric flow-rate of air associated with the air cleaner. While this disclosure may concentrate in great detail on embodiments of an HVAC system comprising an air cleaner, in some cases, having one or more of the features described above, it will be appreciated that this disclosure additionally explicitly contemplates embodiments of a substantially stand-alone air cleaner, in some cases, having one or more of the feature described above.

Figure 1:
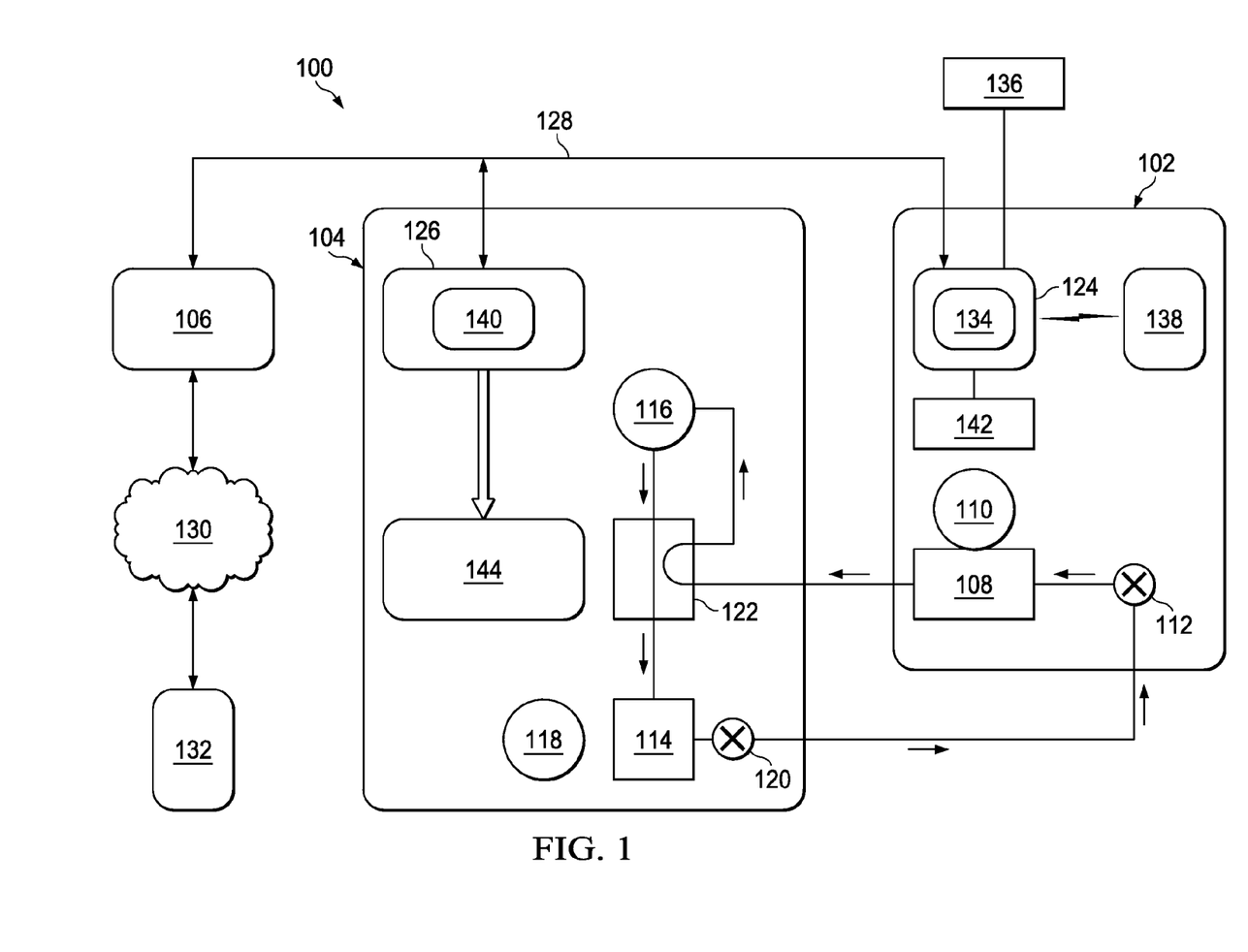
FIG. 1 is a simplified schematic diagram of an HVAC system according to an embodiment of the disclosure.

Referring now to FIG. 1, a simplified schematic diagram of an HVAC system 100 according to an embodiment of this disclosure is shown. HVAC system 100 comprises an indoor unit 102, an outdoor unit 104, and a system controller 106. In some embodiments, the system controller 106 may operate to control operation of the indoor unit 102 and/or the outdoor unit 104. As shown, the HVAC system 100 is a so-called heat pump system that may be selectively operated to implement one or more substantially closed thermodynamic refrigeration cycles to provide a cooling functionality and/or a heating functionality.

Indoor unit 102 comprises an indoor heat exchanger 108, an indoor fan 110, and an indoor metering device 112. Indoor heat exchanger 108 is a plate fin heat exchanger configured to allow heat exchange between refrigerant carried within internal tubing of the indoor heat exchanger 108 and fluids that contact the indoor heat exchanger 108 but that are kept segregated from the refrigerant. In other embodiments, indoor heat exchanger 108 may comprise a spine fin heat exchanger, a microchannel heat exchanger, or any other suitable type of heat exchanger.

The indoor fan 110 is a centrifugal blower comprising a blower housing, a blower impeller at least partially disposed within the blower housing, and a blower motor configured to selectively rotate the blower impeller. In other embodiments, the indoor fan 110 may comprise a mixed-flow fan and/or any other suitable type of fan. The indoor fan 110 is configured as a modulating and/or variable speed fan capable of being operated at many speeds over one or more ranges of speeds. In other embodiments, the indoor fan 110 may be configured a multiple speed fan capable of being operated at a plurality of operating speeds by selectively electrically powering different ones of multiple electromagnetic windings of a motor of the indoor fan 110. In yet other embodiments, the indoor fan 110 may be a single speed fan.

The indoor metering device 112 is an electronically controlled motor driven electronic expansion valve (EEV). In alternative embodiments, the indoor metering device 112 may comprise a thermostatic expansion valve, a capillary tube assembly, and/or any other suitable metering device. The indoor metering device 112 may comprise and/or be associated with a refrigerant check valve and/or refrigerant bypass for use when a direction of refrigerant flow through the indoor metering device 112 is such that the indoor metering device 112 is not intended to meter or otherwise substantially restrict flow of the refrigerant through the indoor metering device 112.

Outdoor unit 104 comprises an outdoor heat exchanger 114, a compressor 116, an outdoor fan 118, an outdoor metering device 120, and a reversing valve 122. Outdoor heat exchanger 114 is a microchannel heat exchanger configured to allow heat exchange between refrigerant carried within internal passages of the outdoor heat exchanger 114 and fluids that contact the outdoor heat exchanger 114 but that are kept segregated from the refrigerant. In other embodiments, the outdoor heat exchanger 114 may comprise a spine fin heat exchanger, a plate fin heat exchanger, or any other suitable type of heat exchanger.

The compressor 116 is a multiple speed scroll type compressor configured to selectively pump refrigerant at a plurality of mass flow rates. In alternative embodiments, the compressor 116 may comprise a modulating compressor capable of operation over one or more speed ranges, the compressor 116 may comprise a reciprocating type compressor, the compressor 116 may be a single speed compressor, and/or the compressor 116 may comprise any other suitable refrigerant compressor and/or refrigerant pump.

The outdoor fan 118 is an axial fan comprising a fan blade assembly and fan motor configured to selectively rotate the fan blade assembly. In other embodiments, the outdoor fan 118 may comprise a mixed-flow fan, a centrifugal blower, and/or any other suitable type of fan and/or blower. The outdoor fan 118 is configured as a modulating and/or variable speed fan capable of being operated at many speeds over one or more ranges of speeds. In other embodiments, the outdoor fan 118 may be configured as a multiple speed fan capable of being operated at a plurality of operating speeds by selectively electrically powering different ones of multiple electromagnetic windings of a motor of the outdoor fan 118. In yet other embodiments, the outdoor fan 118 may be a single speed fan.

The outdoor metering device 120 is a thermostatic expansion valve. In alternative embodiments, the outdoor metering device 120 may comprise an electronically controlled motor driven EEV, a capillary tube assembly, and/or any other suitable metering device. The outdoor metering device 120 may comprise and/or be associated with a refrigerant check valve and/or refrigerant bypass for use when a direction of refrigerant flow through the outdoor metering device 120 is such that the outdoor metering device 120 is not intended to meter or otherwise substantially restrict flow of the refrigerant through the outdoor metering device 120.

The reversing valve 122 is a so-called four-way reversing valve. The reversing valve 122 may be selectively controlled to alter a flow path of refrigerant in the HVAC system 100 as described in greater detail below. The reversing valve 122 may comprise an electrical solenoid or other device configured to selectively move a component of the reversing valve 122 between operational positions.

The system controller 106 may comprise a touchscreen interface for displaying information and for receiving user inputs. The system controller 106 may display information related to the operation of the HVAC system 100 and may receive user inputs related to operation of the HVAC system 100. However, the system controller 106 may further be operable to display information and receive user inputs tangentially and/or unrelated to operation of the HVAC system 100. In some embodiments, the system controller 106 may selectively communicate with an indoor controller 124 of the indoor unit 102, with an outdoor controller 126 of the outdoor unit 104, and/or with other components of the HVAC system 100. In some embodiments, the system controller 106 may be configured for selective bidirectional communication over a communication bus 128. In some embodiments, portions of the communication bus 128 may comprise a three-wire connection suitable for communicating messages between the system controller 106 and one or more of the HVAC system 100 components configured for interfacing with the communication bus 128. Still further, the system controller 106 may be configured to selectively communicate with HVAC system 100 components and/or other device 130 via a communication network 132. In some embodiments, the communication network 132 may comprise a telephone network and the other device 130 may comprise a telephone. In some embodiments, the communication network 132 may comprise the Internet and the other device 130 may comprise a so-called smartphone and/or other Internet enabled mobile telecommunication device.

The indoor controller 124 may be carried by the indoor unit 102 and may be configured to receive information inputs, transmit information outputs, and otherwise communicate with the system controller 106, the outdoor controller 126, and/or any other device via the communication bus 128 and/or any other suitable medium of communication. In some embodiments, the indoor controller 124 may be configured to communicate with an indoor personality module 134, receive information related to a speed of the indoor fan 110, transmit a control output to an electric heat relay, transmit information regarding an indoor fan 110 volumetric flow-rate, communicate with and/or otherwise affect control over an air cleaner 136, and communicate with an indoor EEV controller 138. In some embodiments, the indoor controller 124 may be configured to communicate with an indoor fan controller 142 and/or otherwise affect control over operation of the indoor fan 110. In some embodiments, the indoor personality module 134 may comprise information related to the identification and/or operation of the indoor unit 102.

In some embodiments, the indoor EEV controller 138 may be configured to receive information regarding temperatures and pressures of the refrigerant in the indoor unit 102. More specifically, the indoor EEV controller 138 may be configured to receive information regarding temperatures and pressures of refrigerant entering, exiting, and/or within the indoor heat exchanger 108. Further, the indoor EEV controller 138 may be configured to communicate with the indoor metering device 112 and/or otherwise affect control over the indoor metering device 112.

The outdoor controller 126 may be carried by the outdoor unit 104 and may be configured to receive information inputs, transmit information outputs, and otherwise communicate with the system controller 106, the indoor controller 124, and/or any other device via the communication bus 128 and/or any other suitable medium of communication. In some embodiments, the outdoor controller 126 may be configured to communicate with an outdoor personality module 140 that may comprise information related to the identification and/or operation of the outdoor unit 104. In some embodiments, the outdoor controller 126 may be configured to receive information related to an ambient temperature associated with the outdoor unit 104, information related to a temperature of the outdoor heat exchanger 114, and/or information related to refrigerant temperatures and/or pressures of refrigerant entering, exiting, and/or within the outdoor heat exchanger 114 and/or the compressor 116. In some embodiments, the outdoor controller 126 may be configured to transmit information related to monitoring, communicating with, and/or otherwise affecting control over the outdoor fan 118, a compressor sump heater, a solenoid of the reversing valve 122, a relay associated with adjusting and/or monitoring a refrigerant charge of the HVAC system 100, a position of the indoor metering device 112, and/or a position of the outdoor metering device 120. The outdoor controller 126 may further be configured to communicate with a compressor drive controller 144 that is configured to electrically power and/or control the compressor 116.

The HVAC system 100 is shown configured for operating in a so-called cooling mode in which heat is absorbed by refrigerant at the indoor heat exchanger 108 and heat is rejected from the refrigerant at the outdoor heat exchanger 114. In some embodiments, the compressor 116 may be operated to compress refrigerant and pump the relatively high temperature and high pressure compressed refrigerant from the compressor 116 to the outdoor heat exchanger 114 through the reversing valve 122 and to the outdoor heat exchanger 114. As the refrigerant is passed through the outdoor heat exchanger 114, the outdoor fan 118 may be operated to move air into contact with the outdoor heat exchanger 114, thereby transferring heat from the refrigerant to the air surrounding the outdoor heat exchanger 114. The refrigerant may primarily comprise liquid phase refrigerant and the refrigerant may be pumped from the outdoor heat exchanger 114 to the indoor metering device 112 through and/or around the outdoor metering device 120 which does not substantially impede flow of the refrigerant in the cooling mode. The indoor metering device 112 may meter passage of the refrigerant through the indoor metering device 112 so that the refrigerant downstream of the indoor metering device 112 is at a lower pressure than the refrigerant upstream of the indoor metering device 112. The pressure differential across the indoor metering device 112 allows the refrigerant downstream of the indoor metering device 112 to expand and/or at least partially convert to gaseous phase. The gaseous phase refrigerant may enter the indoor heat exchanger 108. As the refrigerant is passed through the indoor heat exchanger 108, the indoor fan 110 may be operated to move air into contact with the indoor heat exchanger 108, thereby transferring heat to the refrigerant from the air surrounding the indoor heat exchanger 108. The refrigerant may thereafter reenter the compressor 116 after passing through the reversing valve 122.

To operate the HVAC system 100 in the so-called heating mode, the reversing valve 122 may be controlled to alter the flow path of the refrigerant, the indoor metering device 112 may be disabled and/or bypassed, and the outdoor metering device 120 may be enabled. In the heating mode, refrigerant may flow from the compressor 116 to the indoor heat exchanger 108 through the reversing valve 122, the refrigerant may be substantially unaffected by the indoor metering device 112, the refrigerant may experience a pressure differential across the outdoor metering device 120, the refrigerant may pass through the outdoor heat exchanger 114, and the refrigerant may reenter the compressor 116 after passing through the reversing valve 122. Most generally, operation of the HVAC system 100 in the heating mode reverses the roles of the indoor heat exchanger 108 and the outdoor heat exchanger 114 as compared to their operation in the cooling mode.

Figure 2:
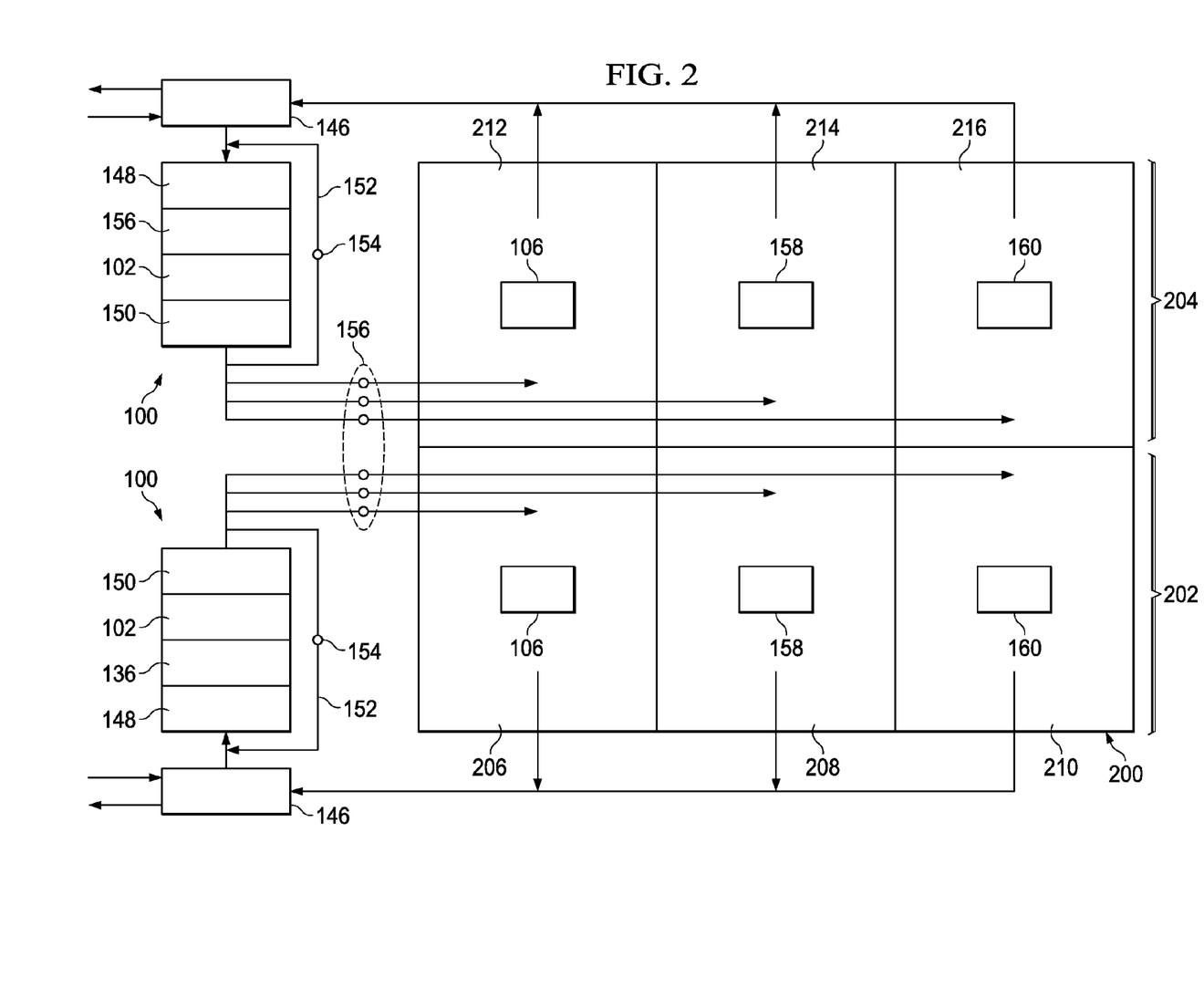
FIG. 2 is a simplified schematic diagram of the air circulation paths for a structure conditioned by two HVAC systems of FIG. 1.

Referring now to FIG. 2, a simplified schematic diagram of the air circulation paths for a structure 200 conditioned by two HVAC systems 100 is shown. In this embodiment, the structure 200 is conceptualized as comprising a lower floor 202 and an upper floor 204. The lower floor 202 comprises zones 206, 208, and 210 while the upper floor 204 comprises zones 212, 214, and 216. The HVAC system 100 associated with the lower floor 202 is configured to circulate and/or condition air of lower zones 206, 208, and 210 while the HVAC system 100 associated with the upper floor 204 is configured to circulate and/or condition air of upper zones 212, 214, and 216.

In addition to the components of HVAC system 100 described above, in this embodiment, each HVAC system 100 further comprises a ventilator 146, a prefilter 148, a humidifier 150, and a bypass duct 152. The ventilator 146 may be operated to selectively exhaust circulating air to the environment and/or introduce environmental air into the circulating air. The prefilter 148 may generally comprise a filter media selected to catch and/or retain relatively large particulate matter prior to air exiting the prefilter 148 and entering the air cleaner 136. The humidifier 150 may be operated to adjust a relative humidity of the circulating air. The bypass duct 152 may be utilized to regulate air pressures within the ducts that form the circulating air flow paths. In some embodiments, air flow through the bypass duct 152 may be regulated by a bypass damper 154 while air flow delivered to the zones 206, 208, 210, 212, 214, and 216 may be regulated by zone dampers 156.

Still further, each HVAC system 100 may further comprise a zone thermostat 158 and a zone sensor 160. In some embodiments, a zone thermostat 158 may communicate with the system controller 106 and may allow a user to control a temperature, humidity, and/or other environmental setting for the zone in which the zone thermostat 158 is located. Further, the zone thermostat 158 may communicate with the system controller 106 to provide temperature, humidity, and/or other environmental feedback regarding the zone in which the zone thermostat 158 is located. In some embodiments, a zone sensor 160 may communicate with the system controller 106 to provide temperature, humidity, and/or other environmental feedback regarding the zone in which the zone sensor 160 is located.

While HVAC systems 100 are shown as a so-called split system comprising an indoor unit 102 located separately from the outdoor unit 104, alternative embodiments of an HVAC system 100 may comprise a so-called package system in which one or more of the components of the indoor unit 102 and one or more of the components of the outdoor unit 104 are carried together in a common housing or package. The HVAC system 100 is shown as a so-called ducted system where the indoor unit 102 is located remote from the conditioned zones, thereby requiring air ducts to route the circulating air. However, in alternative embodiments, an HVAC system 100 may be configured as a non-ducted system in which the indoor unit 102 and/or multiple indoor units 102 associated with an outdoor unit 104 is located substantially in the space and/or zone to be conditioned by the respective indoor units 102, thereby not requiring air ducts to route the air conditioned by the indoor units 102.

Figure 3A:
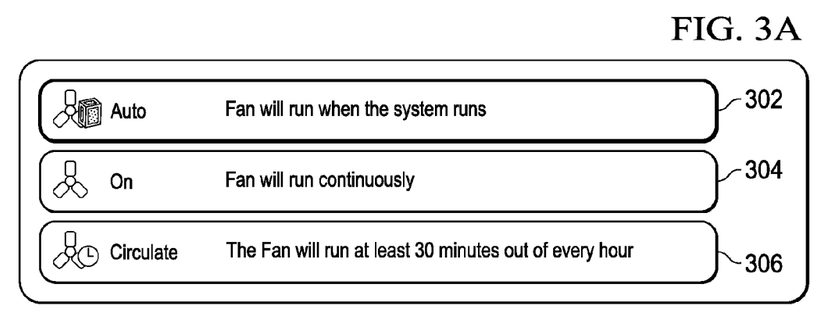
FIGS. 3A-3E are partial views of graphical user interfaces of the HVAC system of FIG. 1 for use in controlling an indoor fan of the HVAC system of FIG. 1.

Referring now to FIGS. 3A-3E, graphical user interfaces of system controller 106 related to selecting an indoor fan 110 mode of operation are shown. In some embodiments, at least one of the system controller 106 and the zone thermostat 158 of an HVAC system 100 may allow a user to designate a preferred indoor fan 110 mode of operation. In some embodiments, the user may select between an "Auto" fan mode, an "On" fan mode, and a "Circulate" fan mode. As shown in FIG. 3A, a user may actuate a virtual button 302 to select the Auto fan mode, virtual button 304 to select the On fan mode, or virtual button 306 to select the Circulate fan mode. In some embodiments, when the Auto fan mode is selected and thereafter enabled, the indoor fan 110 may run when the HVAC system 100 is operating in either the cooling mode to meet a demand for cooling or the heating mode to meet a demand for heating. However, with the Auto fan mode enabled, once the demand for cooling or heating has been met and the HVAC system 100 is no longer operating to meet such a demand, operation of the indoor fan 110 may be discontinued.

Figure 3B:
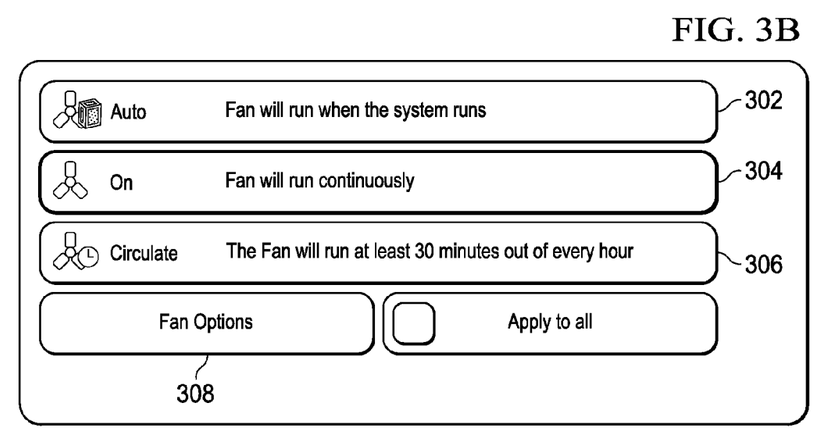

Referring now to FIG. 3B, when the fan On mode is selected and thereafter enabled, the indoor fan 110 may be operated during both the operation of the HVAC system 100 to meet a demand for heat or cool as well as when the HVAC system 100 is not operating to meet a demand for heat or cool. In other words, when the fan On mode is enabled, the indoor fan 110 may be operated substantially constantly unless some other HVAC system 100 feature is caused to override such operation. Further, selection of the virtual button 304 may cause presentation of a virtual button 308 configured to present "Fan Options."

Figure 3C:
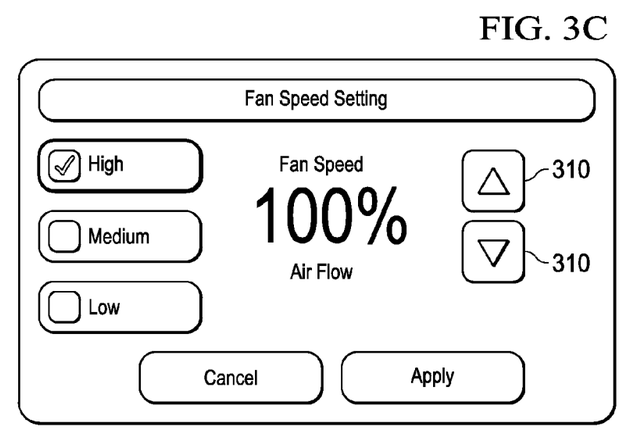

Referring now to FIG. 3C, a graphical user interface displaying fan options is provide in response to actuation of the virtual button 308. The graphical user interface of FIG. 3C may allow a user to designate a speed and/or percentage of operating capacity at which the indoor fan 110 should operate when the indoor fan 110 is operated according to the fan On mode but where the indoor fan 110 is not being operated because the HVAC system 100 is operating to meet a demand for cooling or heating. In some embodiments, a user may select between a high, medium, and/or low fan speed setting. In some embodiments, the high speed setting may result in setting the indoor fan 110 to operate at about 100% fan speed and/or to provide 100% air flow. In some embodiments, the medium speed setting may result in setting the indoor fan 110 to operate at about 75% fan speed and/or to provide about 75% air flow. In some embodiments, the low speed setting may result in setting the indoor fan 110 to operate at about 50% fan speed and/or to provide about 50% air flow. However, in some embodiments, a user may be allowed to designate a particular percentage of fan speed and/or to designate a particular percentage of air flow by one of directly entering a desired value or selecting a desired value from a range of allowed values. For example, a user may be allowed to select any value from 25% to 100% in 5% increments by selectively actuating virtual buttons 310. Of course, in alternative embodiments, the ranges of available values may vary by having an available value of lower than 25%, above 100%, and/or in increments other than 5% increments.

Figure 3D:
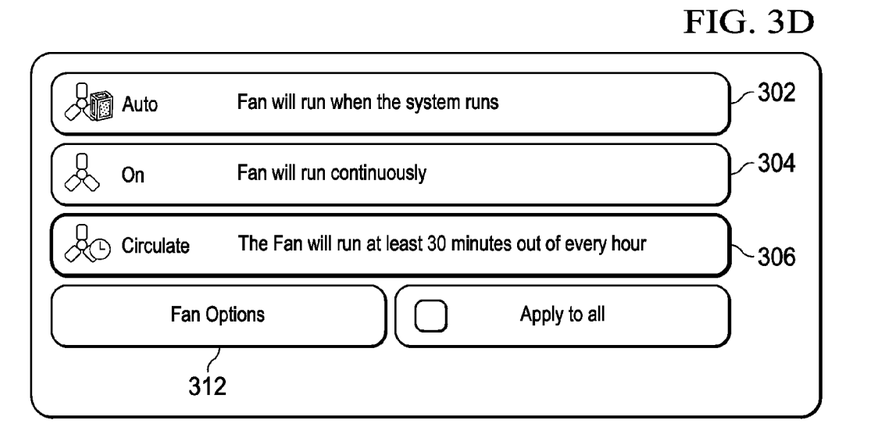

Referring to FIG. 3D, when the fan Circulate mode is selected and thereafter enabled, the indoor fan 110 may be operated during both the operation of the HVAC system 100 to meet a demand for heat or cool as well as for a user selected duration per period of time. For example, in some embodiments, the period of time may be one hour and the user selected duration may be some time duration equal to or less than one hour. Further, selection of the virtual button 306 may cause presentation of a virtual button 312 configured to present "Fan Options."

Figure 3E:
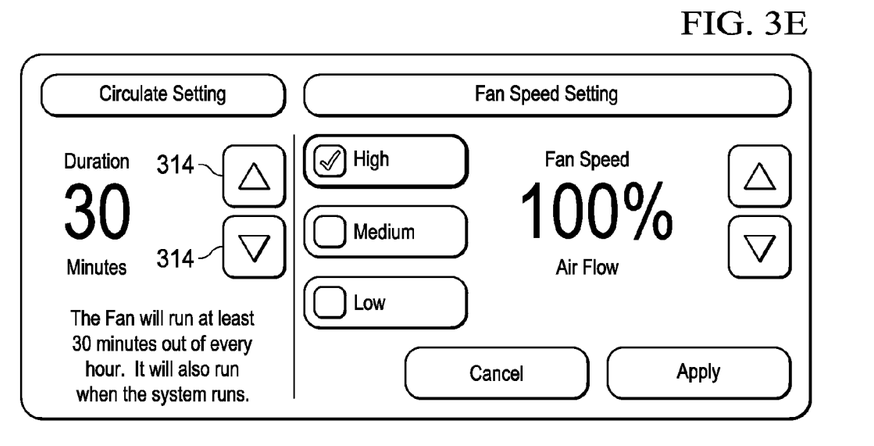

Referring now to FIG. 3E, a graphical user interface displaying fan options is provide in response to actuation of the virtual button 312. The graphical user interface of FIG. 3E may allow a user to designate a speed and/or percentage of operating capacity at which the indoor fan 110 should operate when the indoor fan 110 is operated according to the fan Circulate mode but where the indoor fan 110 is not being operated because the HVAC system 100 is operating to meet a demand for cooling or heating. In some embodiments, a user may select between a high, medium, and/or low fan speed setting. In some embodiments, the fan speed may be selected by a user in a manner substantially similar to that described above with respect to the user interface of FIG. 3C. Further, the graphical user interface of FIG. 3E may allow a user to designate a circulation duration by one of directly entering a desired value or selecting a desired value from a range of allowed values. For example, a user may be allowed to select any value from 10 minutes per hour to 60 minutes per hour in 5 minute increments by selectively actuating virtual buttons 314. Of course, in alternative embodiments, the ranges of available values may vary by having an available value of lower than 10 minutes and/or in increments other than 5 minute increments. In yet other alternative embodiments, the duration may be a portion of a period of time different than one hour. For example, in some embodiments, a user may be allowed to designate a circulation duration per day. As such, a user may effectively control the indoor fan 110 to operate for at least a selected duration of time per each period. In some embodiments, the amount of time the indoor fan 110 is operated while the HVAC system 100 is operated to meet a demand for cooling or heating may count toward to the circulation duration of indoor fan 110 operation specified by the user.

Figure 4:
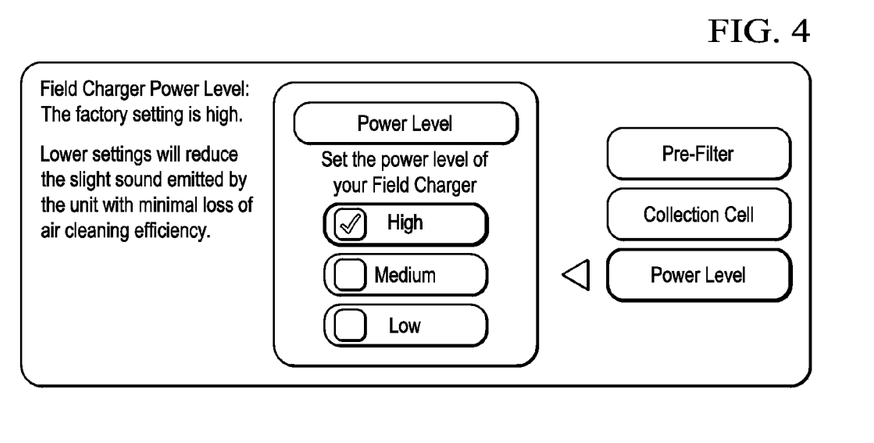
FIG. 4 is a partial view of a graphical user interface of the HVAC system of FIG. 1 for use in controlling an air cleaner of the HVAC system of FIG. 1.

Referring now to FIG. 4, a graphical user interface of system controller 106 related to selecting a power level setting for the air cleaner 136 is shown. In some embodiments, the air cleaner 136 may comprise an electrostatic precipitation air cleaner and the air cleaner may comprise an electrically powered component referred to as a field charger. In some embodiments, varying the electrical supply to the field charger may vary a resultant rate of ozone generated by the air cleaner 136. For example, in some embodiments, providing relatively higher voltage to the field charger may relatively increase a rate of ozone produced by the air cleaner 136 as compared to a rate of ozone produced by the air cleaner 136 when a relatively lower voltage is provided to the field charger. In some embodiments, the air cleaner 136 may be configured to operate at one of three power level settings, high, medium, and low, each setting being indicative of relative voltage levels provided to the field charger.

In alternative embodiments, an air cleaner 136 may be configured to selectively modulate and/or vary a power level setting over one or more ranges of power levels. For example, the air cleaner 136 may even be capable of adjusting a voltage supplied to a field charger so that a rate of ozone produced by the air cleaner 136 is adjustable over a relatively large range of values at which the air cleaner 136 may be effectively operated. Still further, in alternative embodiments of an air cleaner 136, the air cleaner 136 may comprise other components that contribute to a rate of ozone generated by the air cleaner 136 in addition to or instead of a field charger. During subsequent discussion of a so-called air cleaner power setting and/or field charger power setting, it will be appreciated that it is intended that operating an air cleaner 136 at a relatively higher setting is meant to control the air cleaner 136 and/or one or more of the components of the air cleaner 136 to have a first or higher rate of ozone production while operating the air cleaner 136 at a relatively lower setting is meant to control the air cleaner 136 and/or one or more of the components of the air cleaner 136 to have a second or relatively lower rate of ozone production as compared to the first or higher rate of ozone production.

Figure 5:
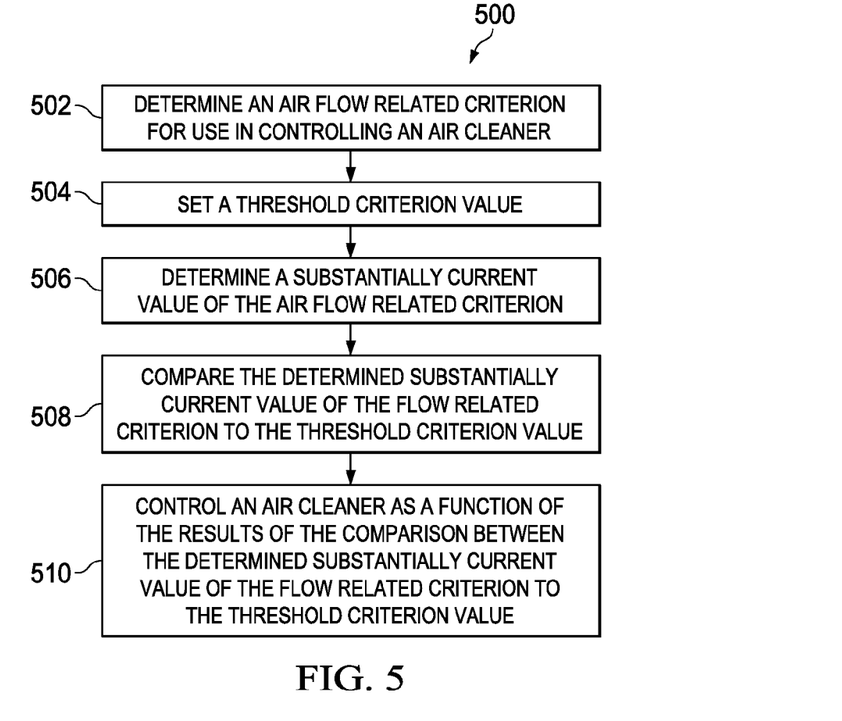
FIG. 5 is a simplified flowchart of a method of controlling an air cleaner according to an embodiment of the disclosure.

Referring now to FIG. 5, a simplified flowchart of a method 500 of controlling an air cleaner 136 is shown. As represented at block 502, the method 500 may comprise determining an air flow related criterion for use in controlling the air cleaner 136. The air flow related criterion may comprise information related to an indoor fan 110 speed setting, a measured speed of the indoor fan 110, an estimated, calculated, predicted, and/or actual value of volumetric flow-rate associated with the indoor fan 110 and/or the air cleaner 136. For example, the air flow related criterion may comprise the unitless indoor fan 110 speed setting at which the HVAC system 100 uses to regulate a speed of the indoor fan 110. As described previously, the unitless indoor fan 110 speed setting may vary over time as a result of operating the indoor fan 110 according to the various indoor fan 110 operating modes described above with reference to FIGS. 3A-3E. More specifically, in some embodiments, the unitless indoor fan 110 speed setting may have a value of 0% to 100%, or above.

As represented at block 504, the method 500 may further comprise setting a threshold criterion value. For example, in some embodiments, the threshold criterion value may be set as a unitless indoor fan 110 speed of 100%.

As represented at block 506, the method 500 may further comprise determining a substantially current value of the air flow related criterion. For example, in some embodiments, a current indoor fan 110 speed setting value may be determined.

As represented at block 508, the method 500 may further comprise comparing the determined substantially current value of the air flow related criterion to the threshold criterion value. In some embodiments, the comparison may comprise determining whether the determined substantially current value of the air flow related criterion is equal to or greater than the threshold criterion value.

As represented at block 510, the method 500 may further comprise controlling the air cleaner 136 as a function of the results of the comparison made at block 508.

Figure 6:
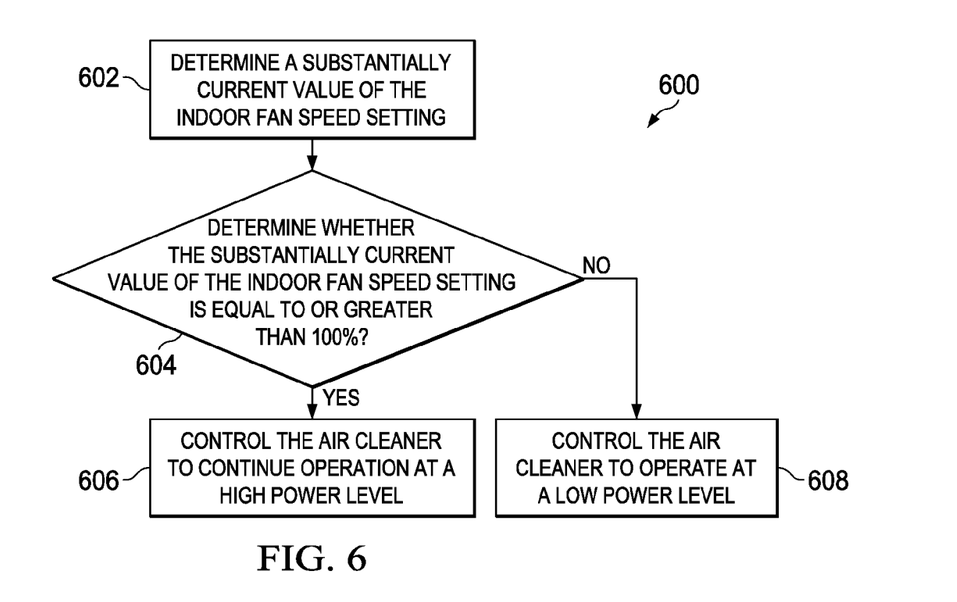
FIG. 6 is a simplified flowchart of another method of controlling an air cleaner according to an embodiment of the disclosure.

Referring now to FIG. 6, a simplified flowchart of a method 600 of controlling an air cleaner 136 is shown. At block 602, a substantially current value of the indoor fan 110 speed setting is determined. At block 604, it is determined whether the substantially current value of the indoor fan 110 speed setting is equal to or greater than 100%. As represented at block 606, if it is determined that the substantially current value of the indoor fan 110 speed setting is equal to or greater than 100%, the air cleaner 136 may be controlled to continue operation at a so-called high power level. As represented at block 608, if it is determined that the substantially current value of the indoor fan 110 speed setting is less than 100%, the air cleaner 136 may be controlled to operate at a so-called low and/or lowest power level.

Figure 7:
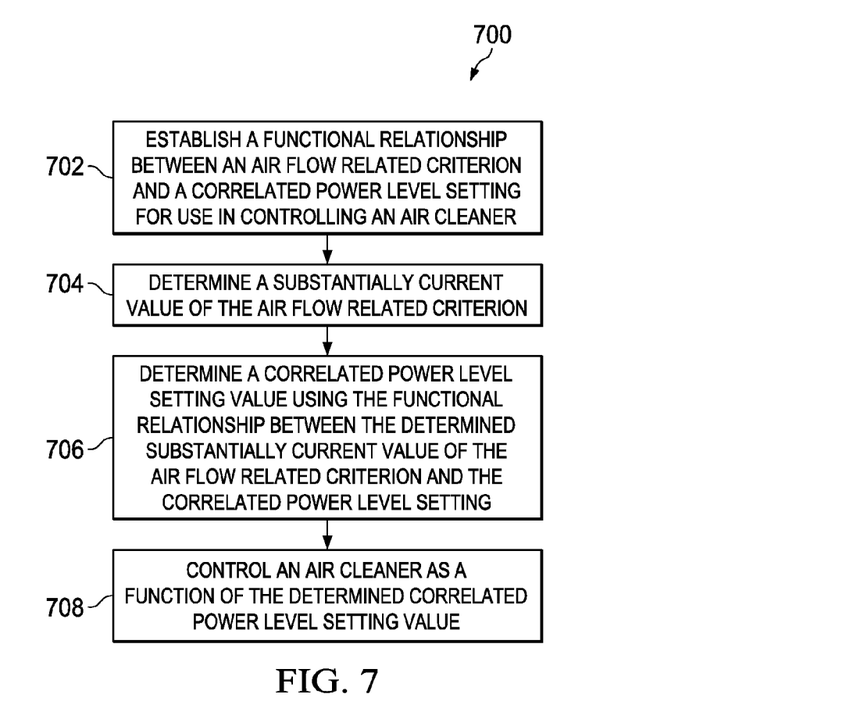
FIG. 7 is a simplified flowchart of yet another method of controlling an air cleaner according to an embodiment of the disclosure.

Referring now to FIG. 7, a simplified flowchart of a method 700 of controlling an air cleaner 136 is shown. As represented at block 702, the method 700 may comprise establishing a functional relationship between an air flow related criterion and a correlated power level setting for use in controlling the air cleaner 136. The functional relationship may comprise a mathematical function, such as, but not limited to, a substantially linear function. However, in alternative embodiments, the functional relationship may comprise non-linear functions and/or even a functional relationship that is at least partially not based on a mathematical function (i.e. a discrete value correlation look-up table).

As represented at block 704, the method 700 may further comprise determining a substantially current value of the air flow related criterion. For example, in some embodiments, a current indoor fan 110 speed setting value may be determined.

As represented at block 706, the method 700 may further comprise using the determined substantially current value of the air flow related criterion of block 704 and the functional relationship established of block 702 to determine a correlated power level setting value for the air cleaner 136.

As represented at block 708, the method 700 may further comprise controlling the air cleaner 136 as a function of the correlated power level setting value determined at block 706. In some embodiments, such controlling of the air cleaner 136 may comprise operating the air cleaner 136 at a power level setting equal to the correlated power level setting value determined at block 706.

In some embodiments, one or more aspects of the methods described above may be performed at least partially by the system controller 106 and/or the indoor controller 124. In some embodiments, the indoor controller 124 may be configured to communicate with and/or otherwise control operation of the air cleaner 136. For example, the indoor controller 124 may be configured for connection with the air cleaner 136 via low voltage control wiring that may be used to affect a power level of the air cleaner 136. In other embodiments, the air cleaner 136 may be configured for communication with the system controller 106 via the indoor controller 124, via the communication bus 128, and/or any other suitable device and/or communication medium so that the system controller 106 may communicate with and/or otherwise control operation of the air cleaner 136. Of course, in alternative embodiments, the air cleaner 136 and/or the indoor fan 110 may be controlled by any other suitable component and/or via any suitable communication medium.

It will be appreciated that, in some embodiments, controlling the indoor fan 110 and/or the air cleaner 136 in one or more of the manners described above may coincidentally reduce a so-called spark over noise sometimes generated by air cleaners 136 that comprise electrostatic precipitation components. As such, it will be appreciated that this disclosure explicitly contemplates the implementations of the systems and methods described herein as being capable of reducing an occurrence or likelihood of user perception of such spark over noise in addition to affecting an ozone concentration outputted by the air cleaners 136.

It will be appreciated that the systems and methods disclosed above are directed primarily toward altering operation of the air cleaner 136 (i.e. adjusting a power level of the air cleaner 136) in response to characteristics of the operation of the indoor fan 110 (i.e. the determined indoor fan 110 speed setting) to control concentrations of ozone outputted from the air cleaner 136. However, this disclosure explicitly contemplates alternative embodiments which utilize substantially similar systems and methods to control concentrations of ozone outputted from the air cleaner 136 by altering operation of the indoor fan 110 in response to characteristics of the operation of the air cleaner 136. For example, in some embodiments, operating the air cleaner 136 at a relatively higher power level may result in an increase in the speed of the indoor fan 110.

Figure 8:
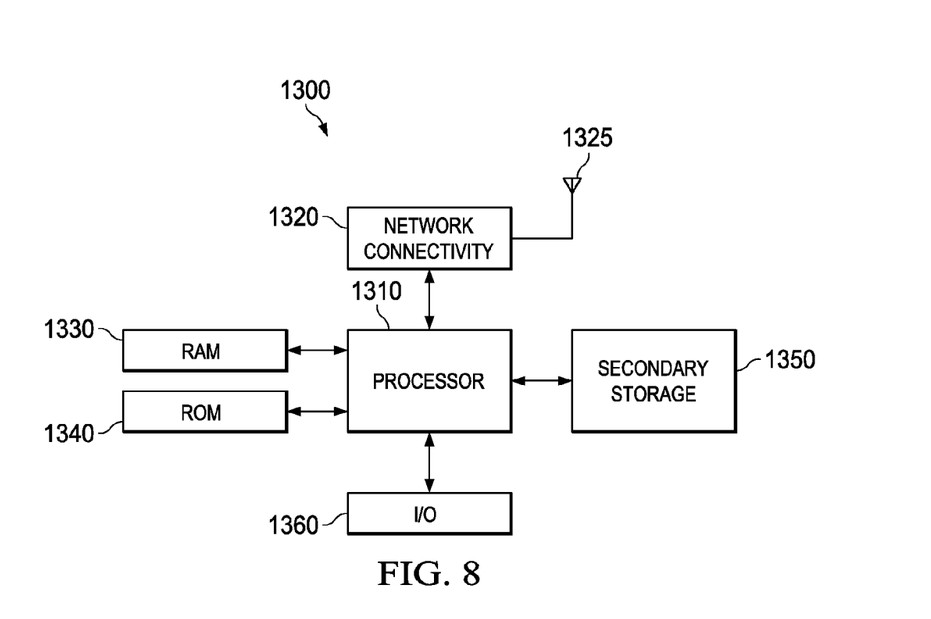
FIG. 8 illustrates a general-purpose processor (e.g., electronic controller or computer) system suitable for implementing the embodiments of the present disclosure.

Referring now to FIG. 8, the HVAC system 100 may comprise one or more processing components capable of executing instructions related to the methods and/or operation described previously. The processing component may be a component of a computer system. FIG. 8 illustrates a typical, general-purpose processor (e.g., electronic controller or computer) system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, optical disk, or other drive). While only one processor 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embodied in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs or instructions that are loaded into RAM 1330 when such programs are selected for execution or information is needed.

The I/O devices 1360 may include liquid crystal displays (LCDs), touch screen displays, keyboards, keypads, switches, dials, mice, track balls, voice recognizers, card readers, paper tape readers, printers, video monitors, transducers, sensors, or other well-known input or output devices. Also, the transceiver 1325 might be considered to be a component of the I/O devices 1360 instead of or in addition to being a component of the network connectivity devices 1320. Some or all of the I/O devices 1360 may be substantially similar to various components depicted in the previously described.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A method of controlling an air cleaner, comprising:
   determining an air flow related criterion value, wherein the air flow is associated with an air flow through an air cleaner;
   comparing the determined air flow related criterion value to a threshold criterion value;
   controlling the air cleaner as a function of a result of comparing the determined air flow related criterion value to the threshold criterion value.

2. The method of claim 1, wherein the air flow related criterion value is a fan speed setting of a fan configured to provide at least a portion of the air flow through the air cleaner.

3. The method of claim 1, wherein the air flow related criterion value is a volumetric flow-rate setting of a fan configured to provide at least a portion of the air flow through the air cleaner.

4. The method of claim 1, wherein the air flow related criterion value is an operation characteristic of a fan configured to provide at least a portion of the air flow through the air cleaner.

5. The method of claim 1, wherein the comparing comprises determining whether the air flow related criterion value is less than the threshold criterion value.

6. The method of claim 5, wherein a power level setting of the air cleaner is lowered in response to a determination that the air flow related criterion value is less than the threshold criterion value.

7. The method of claim 6, wherein the threshold criterion value is a fan speed setting of 100%.

8. The method of claim 6, wherein the air cleaner comprises a low power setting value, a medium power setting value, and a high power setting value and wherein the power level setting of the air cleaner is set to the low power setting value in response to the determination that the air flow related criterion value is less than the threshold criterion value.

9. The method of claim 1, wherein the controlling the air cleaner comprises selectively varying a voltage supplied to a component of the air cleaner.

10. The method of claim 9, wherein the component of the air cleaner is associated with an electrical precipitation functionality of the air cleaner.

\* \* \* \* \*